No. 674,456. Patented May 21, 1901.
G. A. DARDEN.
ATTACHMENT FOR COFFEE OR TEA POTS.
(Application filed Feb. 5, 1901.)
(No Model.)
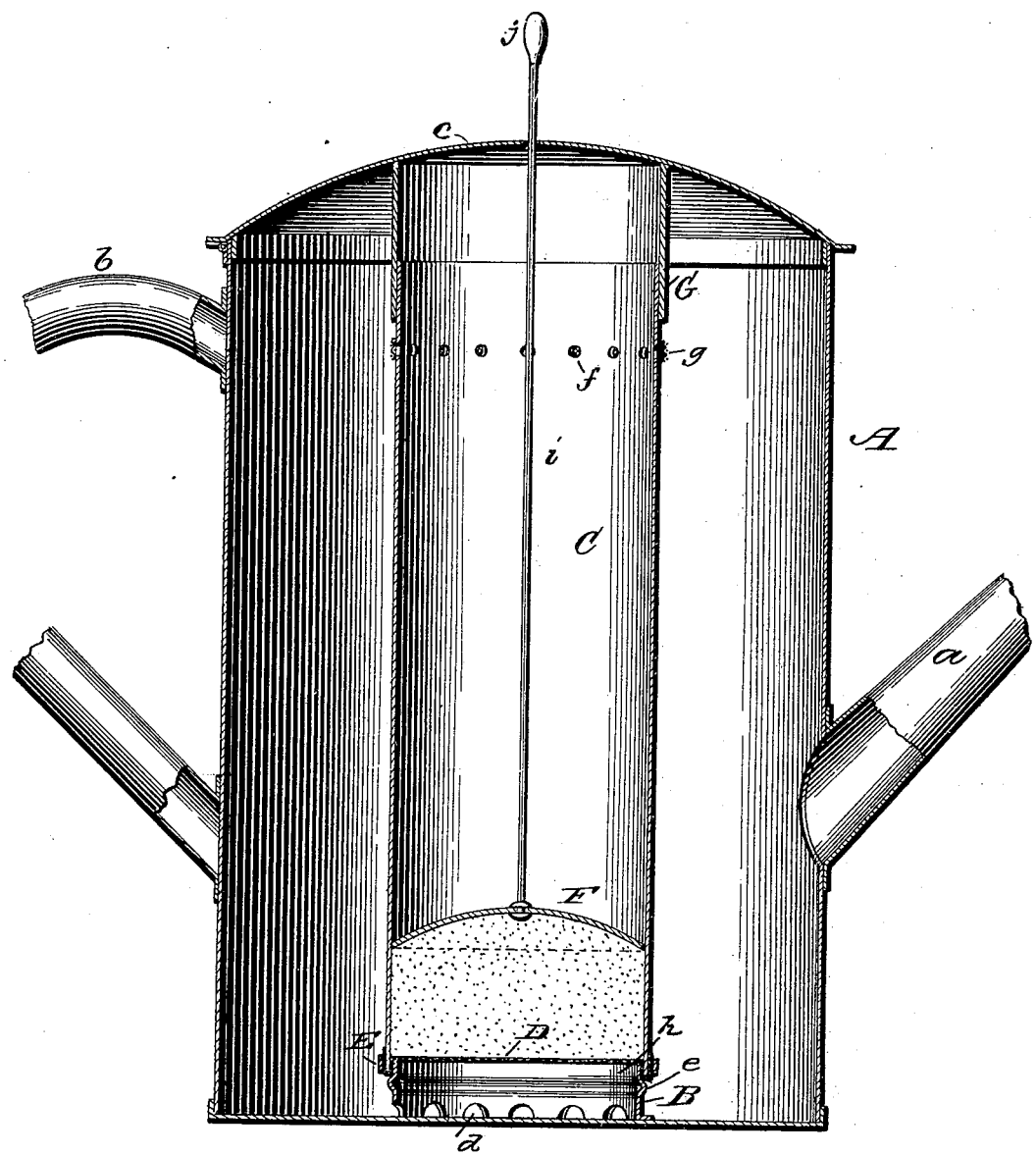
WITNESSES:
INVENTOR
George A. Darden
BY Chas. H. Fowler
Attorney

UNITED STATES PATENT OFFICE.

GEORGE ALBION DARDEN, OF DALLAS, TEXAS.

ATTACHMENT FOR COFFEE OR TEA POTS.

SPECIFICATION forming part of Letters Patent No. 674,456, dated May 21, 1901.

Application filed February 5, 1901. Serial No. 46,122. (No model.)

*To all whom it may concern:*

Be it known that I, GEORGE ALBION DARDEN, a citizen of the United States, residing at Dallas, in the county of Dallas and State of Texas, have invented certain new and useful Improvements in Attachments for Coffee or Tea Pots or other Receptacles; and I do hereby declare that the following is a full, clear, and exact description of the same, reference being had to the annexed drawing, making a part of this specification, and to the letters of reference marked thereon.

The present invention has relation to that class of coffee or tea pots or coffee-urns in which is employed a removable receptacle supported in the body of the pot or urn and provided with a strainer-cloth.

It is the purpose of the invention to materially improve the construction of the pot or urn, whereby the same will be simple and effective and the process of treating the coffee or tea by the action of the boiling water or steam materially enhanced; and it consists in an attachment for a coffee or tea pot or urn constructed substantially as shown in the drawing and hereinafter described and claimed.

In the accompanying drawing, which represents a sectional elevation of a coffee or tea pot, A designates the body thereof, provided with the usual spout $a$, handle $b$, and cover $c$.

My improved attachment, which may be applied to a pot, urn, or any other receptacle adapted for making coffee or tea, consists in a suitable support B, having a plurality of perforations $d$ at or near its base, and above said line of perforations is an outwardly-extending bead $e$ to form a supporting-shoulder for the lower end of an upright cylinder C. This cylinder, which may be of any suitable construction, has a plurality of perforations $f$ near its upper end, which perforations may be covered with wire-gauze, as shown at $g$. The support B has an upwardly-extending flange $h$, over which fits the lower edge of the cylinder C, and a strainer-cloth D is held to the cylinder by a clamping-ring E, removable therefrom, when desired, to renew the cloth or for any other purpose. In the employment of the clamping-ring E, in addition to the extending flange $h$, a double clamping of the strainer-cloth is obtained, which will hold the cloth stretched and perfectly tight to support the coffee or tea above it. It will be noticed that the ring E clamps the strainer-cloth to the cylinder C from the outside thereof, and the extending flange $h$ in like manner clamps the cloth against the inside of the cylinder, and when the cylinder is placed over the flange of the support B a double clamping of the cloth is obtained, the clamping-ring holding the cloth to the cylinder independent of the flange of the support, so that the cylinder, with the cloth, may be removed from the receptacle to take away the exhausted grounds.

The cylinder C is provided with a suitable plunger or piston, comprising a concavo-convex head F, connected to the lower end of a rod $i$, the upper end thereof extending up through a hole in the cover $c$ and terminating in a suitable knob or handle $j$. The cylinder and plunger or piston provide a pump that is in no way secured to the coffee-pot or other receptacle, but may be used with any of the ordinary forms of pots by simply placing the pump in said pot or receptacle and removing the same therefrom when found necessary.

The cover of the pot or other receptacle may be provided with a downwardly-extending sleeve G to close the upper end of the cylinder C, or the upper end of the cylinder may be closed in any other suitable manner, as I do not wish to be limited to the precise construction shown, as the parts may be variously modified or changed without affecting the essential features of the invention, such as substituting finely-perforated sheet metal for the fine wire-gauze to cover the perforation in the cylinder. Also my attachment may be employed with any suitable receptacle adapted to make coffee or tea, as found desirable.

The ground coffee being placed in the cylinder, the boiling water is poured over it, after which the plunger F is immediately inserted and forced downward, which will force the water through the coffee and in doing so it will tend to create a partial vacuum in the upper part of the cylinder, which partial vacuum is prevented by the flow of the steam from the pot into the upper part of the cylinder, through the perforations near the top thereof.

On raising the plunger it will draw the water back through the coffee similar to a pump and when the plunger passes above the perforations the water will fall back and seek its level in the pot and cylinder, the steam again passing from the pot into the cylinder, through the perforations thereof, and the plunger in its descent will catch this steam and force it along with the boiling water through the coffee, the cylinder acting as a pump-cylinder and the plunger as a piston.

Having now fully described my invention, what I claim as new, and desire to secure by Letters Patent, is—

1. An attachment adapted to be placed within a coffee or tea pot or other receptacle, consisting of an upright cylinder and a plunger or piston contained therein, said cylinder having a strainer at its lower end and passages at the top and bottom of the cylinder for the steam and water to circulate, substantially as and for the purpose set forth.

2. An attachment adapted to be placed within a coffee or tea pot or other receptacle, consisting of a perforated support, a cylinder with strainer fitting over the support, said cylinder having perforations near its upper end, and a suitable plunger or piston for the cylinder, and means for closing the upper end thereof, substantially as and for the purpose specified.

3. An attachment for coffee or tea pots or other receptacles, consisting of a perforated support having supporting-bead and a flange above the same, a cylinder adapted to be placed within the pot or receptacle and removably connected to the support, a strainer upon the lower end of the cylinder, a clamping-ring therefor, a plunger or piston within the cylinder, and a depending sleeve upon the cover of the receptacle, substantially as set forth.

In testimony that I claim the above I have hereunto subscribed my name in the presence of two witnesses.

GEORGE ALBION DARDEN.

Witnesses:
FRANK L. EVANS,
JULIUS F. HOUSE.